US011725709B2

(12) United States Patent
Battlogg (10) Patent No.: US 11,725,709 B2
(45) Date of Patent: Aug. 15, 2023

(54) ROTATION DAMPER WITH A MAGNETORHEOLOGICAL FLUID AND DAMPING METHOD

(71) Applicant: INVENTUS ENGINEERING GMBH, St. Anton I.M. (AT)

(72) Inventor: Stefan Battlogg, St. Anton I.M. (AT)

(73) Assignee: INVENTUS Engineering GmbH, St. Anton im Montafon (AT)

( * ) Notice: Subject to any disclaimer, the term of this patent is extended or adjusted under 35 U.S.C. 154(b) by 224 days.

(21) Appl. No.: 16/468,370

(22) PCT Filed: Dec. 12, 2017

(86) PCT No.: PCT/EP2017/082474
§ 371 (c)(1),
(2) Date: Jul. 31, 2019

(87) PCT Pub. No.: WO2018/108941
PCT Pub. Date: Jun. 21, 2018

(65) Prior Publication Data
US 2019/0346008 A1 Nov. 14, 2019

(30) Foreign Application Priority Data
Dec. 12, 2016 (DE) .......................... 102016124115.6

(51) Int. Cl.
*F16F 9/53* (2006.01)
*F16F 9/14* (2006.01)

(52) U.S. Cl.
CPC .............. *F16F 9/535* (2013.01); *F16F 9/145* (2013.01); *F16F 2224/045* (2013.01); *F16F 2232/06* (2013.01)

(58) Field of Classification Search
CPC .... F16F 9/535; F16F 9/145; F16F 9/12; F16F 15/03; F16F 2232/06; F16F 2222/06
See application file for complete search history.

(56) References Cited

U.S. PATENT DOCUMENTS 4,001,844 A * 1/1977 McClintock ........... G03B 7/083
396/304
4,596,320 A * 6/1986 Shimokura ............. F16F 9/462
188/266.4
(Continued)

FOREIGN PATENT DOCUMENTS

CN 102397158 B 7/2014
DE 102005021945 B3 2/2007
(Continued)

*Primary Examiner* — Melody M Burch
(74) *Attorney, Agent, or Firm* — Laurence A. Greenberg; Werner H. Stemer; Ralph E. Locher (57) ABSTRACT

A rotation damper has a housing, a magnetic field source and a damper shaft designed as a hollow shaft, and a coupling rod arranged inside the damper shaft. The hollow shaft and the coupling rod form interacting transmission units and convert a relative axial movement of the coupling rod into a rotational movement of the hollow shaft. A displacer unit is arranged in the housing. The displacer unit includes the damper shaft and meshing displacer components that are rotatable in relation to each other. The displacer unit contains a magnetorheological fluid as the working fluid and can be operated thereby. The magnetic field source is configured for applying a magnetic field to the displacer components in order to dampen a rotational movement of the damper shaft.

16 Claims, 4 Drawing Sheets

(56) References Cited

U.S. PATENT DOCUMENTS

| | | | | |
|---|---|---|---|---|
| 5,036,236 | A * | 7/1991 | Wilson | F16C 32/0446 310/90.5 |
| 5,257,680 | A * | 11/1993 | Corcoran | F16F 7/02 188/129 |
| 5,277,281 | A * | 1/1994 | Carlson | F16F 9/535 188/267 |
| 6,318,512 | B1 * | 11/2001 | De Vries | H02K 7/06 188/72.1 |
| 6,694,856 | B1 * | 2/2004 | Chen | F16F 9/535 89/43.01 |
| 2003/0192977 | A1 * | 10/2003 | Specht | B60R 22/3413 242/379.1 |
| 2005/0087408 | A1 * | 4/2005 | Namuduri | F16F 9/535 188/267.1 |
| 2007/0037650 | A1 * | 2/2007 | Wessely | H02K 7/116 475/5 |
| 2007/0045068 | A1 | 3/2007 | Namuduri et al. | |
| 2009/0121398 | A1 * | 5/2009 | Inoue | B60G 15/067 267/140.14 |
| 2011/0148071 | A1 * | 6/2011 | Battlogg | B62K 25/04 280/286 |
| 2014/0231197 | A1 * | 8/2014 | Watanabe | F16F 9/12 188/290 |
| 2015/0247548 | A1 * | 9/2015 | Battlogg | F16F 9/368 188/267.2 |
| 2015/0345134 | A1 * | 12/2015 | Takahashi | F16F 15/027 52/167.2 |
| 2016/0009158 | A1 * | 1/2016 | Baasch | F04C 2/101 188/267.1 |
| 2018/0298976 | A1 * | 10/2018 | Battlogg | F16F 9/12 |
| 2019/0111300 | A1 | 4/2019 | Battlogg | |

FOREIGN PATENT DOCUMENTS

| | | |
|---|---|---|
| DE | 102013203331 A1 | 8/2014 |
| DE | 102016118920 A1 | 10/2017 |
| JP | 2005256888 A | 9/2005 |
| JP | 2009068571 A | 4/2009 |
| JP | 2009287639 A | 12/2009 |
| JP | 2014173697 A | 9/2014 |

* cited by examiner

ROTATION DAMPER WITH A MAGNETORHEOLOGICAL FLUID AND DAMPING METHOD

BACKGROUND OF THE INVENTION

FIELD OF THE INVENTION:

The present invention relates to a rotary damper, wherein the rotary damper has at least one displacer apparatus with a damper shaft and with displacer components which engage in one another and rotate in order to damp a rotational movement of the damper shaft.

A very wide range of dampers have become known in the prior art with which a targeted damping of movements is possible.

US 2015/0345134 A1 discloses a damper for damping vibrations of buildings in the case of earthquakes. In this case, a linear movement is converted into a rotational movement via a spindle construction. For damping of the rotational movement, a thin shear gap filled with a magnetorheological fluid is exposed to a magnetic field of several coils. The known prior art functions, but requires a high mechanical and electrical outlay in order to be able to damp high forces or high torques with the thin shear gap. The known damper operates via shear forces ("shear mode") in the shear gap.

BRIEF SUMMARY OF THE INVENTION

The object of the present invention is thus to make available an advantageous and low-cost rotary damper in the case of which high damping forces can be generated more easily.

This object is achieved by a rotary damper with the features as claimed and by a method with the features as claimed. Preferred further developments of the invention are the subject matter of the subordinate claims. Further advantages and features of the present invention will become apparent from the general description and the description of the exemplary embodiments.

A rotary damper according to the invention has a housing and at least one magnetic field source and a damper shaft formed as a hollow shaft. A coupling rod is received in the damper shaft. The hollow shaft and the coupling rod have transmission units which interact with one another in order to convert a relative axial movement of the coupling rod into a rotational movement of the hollow shaft. At least one displacer apparatus is arranged in the housing. The displacer apparatus comprises displacer components which engage in one another and are rotatable relative to one another and the damper shaft and contains (at least) a magnetorheological fluid as the working fluid and can thus be operated. The magnetic field source is suitable and formed for a magnetic field to (at least partially) act upon the displacer components (which engage in one another and are rotatable relative to one another) in order to damp a rotational movement of the damper shaft.

The rotary damper according to the invention has many advantages. A significant advantage of the rotary damper according to the invention is achieved in that the rotary damper contains a displacer apparatus with a magnetorheological fluid. A coupling rod is furthermore assigned, the axial movement of which is converted into a rotational movement of the damper shaft via transmission units. The rotary damper does not operate with a cylindrical shear gap in which shear forces act. In the case of the rotary damper according to the invention, a significant part of the braking torque is achieved by the displacer components which rotate relative to one another and engage in one another. The displacer components displace the magnetorheological fluid locally during rotation. A simple cylindrical shear gap is thus not active, but rather there arise complex influences of the MRF particles in the magnetorheological working fluid.

In the case of such a configuration, no preloading into an end position is in principle present. The rotary damper is not pretensioned in any direction. Identical characteristics in both rotational directions can in principle be set as result of this. The smoothness or the stiffness of a damped linear movement can be set independently of the direction of movement. Due to the fact that an axial movement of the coupling rod is converted into a rotational movement of the damper shaft, suitable transmission takes place so that the rotary damper is operated with a suitable rotational speed. The rotary damper can be rotated with several revolutions, while the axial movement is small or large. No torque transmission takes place so that the maximum torque which can be generated must be low where applicable. A low-cost damper which is also of small design and is lightweight and expedient and is thus suitable for series use is thus also realized for large forces and moments.

The term "damp" here refers to a damping of a movement which can also be referred to as braking. This means that the rotary damper can also be referred to as a braking apparatus. The damping of the movement can lead to a fixing of the components or connecting elements which can be moved relative to one another so that the connecting units are fixed in a specific angle position and can only be moved away from there by a particularly large force which exceeds the maximum force of the rotary damper.

It is preferably possible to block the movement of the connecting units relative to one another in a controlled manner via the rotary damper.

In all the configurations, a relative axial movement of the coupling rod is converted into a rotational movement of the hollow shaft.

The coupling rod preferably comprises a notch profile as a transmission unit and the other transmission unit has a notch profile adapted thereto. As a result of the adapted notch profiles, the axial movement can be converted into a rotational movement.

The coupling rod preferably comprises a threaded spindle as a first transmission unit and the second transmission unit is formed as a threaded nut.

In all the configurations, it is possible that the notch profiles are formed as a toothing or as a thread or the like. It is, however, also possible that a transmission is carried out via (at least) a movement screw, a roller threaded spindle, a ball screw, a friction wheel or the like.

The second transmission unit is preferably connected to the damper shaft in a rotationally fixed manner. The term "rotationally fixed" means, in the sense of the present invention, "substantially rotationally fixed". The connection does not have to be play-free. It is vital that a transmission of the movement takes place during a continuous movement.

The damper shaft is formed as a hollow shaft and is coupled in particular (directly) in a rotationally fixed manner to the threaded nut. In the case of such a configuration, a first transmission unit is preferably embodied as a threaded spindle and the second transmission unit as a threaded nut. The threaded nut can be a component of the hollow shaft and be manufactured, for example, in one piece with it. The threaded nut is preferably a separate component and coupled via a corresponding coupling contour in a rotationally fixed manner to the hollow shaft.

The threaded nut is preferably manufactured at least partially from a plastic. A surface of the threaded nut from plastics has the advantage that lubrication of the contact regions is also carried out at the same time as the transmission and conversion of an axial movement into a rotational movement. Or no lubrication is necessary as a result of the good dry running properties of the plastic.

In all the configurations, it is also possible that the threaded nut is coupled in a rotationally fixed manner to the damper shaft via coupling means such as a friction wheel, a belt, a chain or via an external toothing. In the case of such configurations, the displacer apparatus is arranged, for example, parallel to the threaded rod or the coupling rod. Such a configuration enables a damper shaft with a smaller outer diameter since the threaded spindle does not have to be guided through the hollow shaft. The threaded spindle must have a certain outer diameter in order to offer the necessary kink protection.

The threaded nut preferably comprises at least one axial stop surface and is received in the housing in a rotatable and axially fixed manner via at least one axial stop.

The displacer apparatus preferably has displacer components which mesh with one another and are rotatable relative to one another. As a result of this, a local displacement of the magnetorheological fluid is achieved in the case of at least part of a revolution and in particular a complete revolution. According to one practical and simplified conception of the actual processes, a type of "flexing" is performed in the case of which particles of the magnetorheological fluid which are interlinked to one another when the magnetic field is active must be locally broken up, while a displacement through small and narrowing gaps is also performed simultaneously as a result of the intermeshing structure of the displacer components which engage in one another and are rotatable relative to one another. In this regard, the conception is that wedging effects and/or valve effects also play a role in the case of the generated torque or braking torque.

The magnetic field source is preferably suitable and formed to have a magnetic field (at least partially) act upon displacer components which engage in one another and are rotatable relative to one another in order to damp a rotational movement of the damper shaft.

At least one face-side axial gap is formed between the housing and the displacer apparatus. A substantial part of the magnetic field of the magnetic field source preferably penetrates through the axial gap between the housing and the displacer components. As a result of this, the face-side axial gap can be sealed off.

In each case one face-side axial gap is preferably formed between the housing and the displacer apparatus at the two axial ends of the displacer components. A substantial part of the magnetic field of the magnetic field source (or the magnetic field sources) penetrates through both axial gaps between the housing and the displacer components and brings about a sealing of the face-side axial gaps because the carbonyl iron particles of magnetorheological fluids interlink and as a result almost "seal off" under the influence of the magnetic field.

The term "rotary damper" in the sense of the present invention means that parts of the rotary damper must rotate with respect to one another in damping operation. It means here that the displacer components moistened with the magnetorheological fluid rotate relative to one another during damping.

At least one electric coil or at least two electric coils are preferably provided. Each axial end or each face side is preferably assigned in each case at least one electric coil. The magnetic field preferably runs transverse to the axial gap.

In particular, a first displacer component of the displacer components is connected fixedly to the damper shaft. In particular, a second displacer component of the displacer components is received rotatably in the housing of the displacer apparatus. In this case, the first displacer component is in engagement with the second displacer component and is arranged eccentrically with respect to the second displacer component.

The displacer apparatus is embodied in particular as a type of displacer apparatus or pump. The displacer components which are in engagement with one another are moistened by the magnetorheological fluid. It is possible and preferred that the displacer components are embodied as tooth components or gear wheels. The displacer components which engage in one another mesh in particular with one another.

The use of obliquely toothed components such as, for example, spindle screws or other contours which mesh with one another or engage in one another is also possible. The spatial volume is changed during operation as a result of the engagement of the displacer components in one another.

In all the configurations, it is possible and preferred that the magnetic field source comprises at least one additional permanent magnet. A targeted static magnetic field can be generated by a permanent magnet in order to generate or make available, for example, a base torque of a certain level. This magnetic field of the permanent magnet can be amplified or weakened in a targeted manner by the electric coil of the magnetic field source so that the magnetic field can preferably be set as desired between 0% and 100%. A corresponding braking torque results from this which can also be set preferably between 0% and 100%. In the case of a magnetic field which is switched off or reduced to a low value, it is possible to generate a low base torque.

The first displacer component preferably has an external toothing and the second displacer component has an internal toothing. In this case, the second displacer component is preferably received rotatably in the housing. The first displacer component can be formed by an external toothing on the hollow shaft. The second displacer component can be formed as a toothed ring with an internal toothing.

In all of the configurations, it is preferred that an inner space of the displacer apparatus can be exposed to a significant part of the magnetic field of the magnetic field source. This means that in particular at least a part and preferably the significant part of the inner space and particularly preferably the entire or almost the entire inner space of the displacer apparatus can be exposed to the magnetic field of the magnetic field source.

In preferred further developments, the displacer apparatus comprises at least one damping gap or damping duct which is arranged in particular radially between the second displacer component and the housing. At least a significant part of the magnetic field of the magnetic field source preferably penetrates through the damping gap which is arranged in particular radially between the second displacer component and the housing. For example, the magnetorheological fluid can be conducted through the interior of the displacer apparatus and is returned to the output side through the damping gap between the housing and the displacer components. The damping duct then serves as a damping valve. As a result of this, damping force is generated after the valve mode. The damping force depends on the strength of the magnetic field (and the fixed duct dimensions here). The braking torque which can be or is generated overall depends on many factors since damping forces are made up of the valve mode, the shear mode and of wedging effects and further complex effects at the displacer components.

The second displacer component is preferably guided rotatably in the housing via a multiplicity of guide units in order to ensure a defined damping gap between the second displacer component and the housing. The guide units are preferably arranged substantially symmetrically or regularly over the circumference of the second displacer component. Each guide unit can extend over a part of the axial length of the second displacer component and also over almost the entire or the entire axial length of the second displacer component. The guide units can be formed as sliding units or e.g. as bearing units. The sliding blocks can be composed of brass, bronze or similar materials. In particular, the sliding blocks or guide units have a low magnetic relative permeability. It is possible that the damping gap formed, for example, as an annular gap is divided by the guide units into several gap segments or angle segments.

The housing preferably comprises a first and a second end region and therebetween a central region. In particular in each case an electric coil is received in at least one of the two end regions and in particular in both end regions. An axis of the coil is aligned in particular substantially parallel to the damper shaft. The housing is particularly preferably composed of several segments. The housing is preferably composed of two end segments and a central segment, wherein the end regions are then formed by the end segments and the central region by the central segment.

In all of the configurations, it is preferred that a compensating apparatus with a compensating volume is provided. In particular, the compensating apparatus is coupled to the central region. The compensating apparatus with a compensating volume serves to compensate for temperature fluctuations in order to make functionality available in wide temperature ranges. The compensating apparatus furthermore serves to compensate for leakage in order to enable year-long maintenance-free operation.

The housing is preferably composed at least substantially of a magnetically conducting material with a relative permeability greater than 100. In particular, the relative permeability is greater than 500 or greater than 1000. It is possible and preferred that the entire housing is composed of such a material. At least one of the housing portions adjoining the displacer components is particularly preferably composed of a magnetically conducting material.

A ring composed of a material with a relative permeability of less than 10 is preferably arranged axially adjacent to the electric coil in the housing. The ring is arranged in particular axially between the electric coil and the displacer components. The ring and/or the electric coil is/are particularly preferably located substantially or almost entirely or entirely radially further to the outside than the axial gap located between the displacer component and the housing portion. The term "entirely" is understood here such that the ratio radially on the outside is greater than 80% and in particular greater than 90%. The ring is particularly preferably located axially adjacent to and adjoining a central part (central segment) of the housing. The relative permeability of the ring material is in particular less than 5 or even less than 2. The ring is composed in this regard preferably from magnetically non-conducting materials. The ring can be composed, for example, of austenitic steels. The material of the ring has such a magnetic permeability that a magnetic short circuit of the magnetic field of the magnetic field source is reliably prevented.

A significant part of the magnetic field of the magnetic field source preferably penetrates through a or the axial gap between the housing and at least one of the displacer components. This means that the axial gap between the displacer components and the housing is also exposed to a significant part of the magnetic field of the magnetic field source. As a result of this, a sealing action is generated within the axial gap and damping is additionally also increased. Moreover, a pressure loss within the axial gap as a result of overflowing magnetorheological fluid is prevented by the magnetic field and the resultant sealing action (interlinking of the carbonyl iron particles). The magnetic field lines preferably run in this case transverse to the sealing surface and in particular not or only to a small degree in the direction of extent of the gap.

In preferred further developments, the magnetorheological fluid can be conveyed by rotational movement of the displacer components which engage in one another from an inlet of the displacer apparatus to an outlet of the displacer apparatus. It is possible that in each case at least one pressure sensor is provided at the inlet and/or the outlet.

It is possible and preferred that the damper shaft is guided out of the housing on both sides. In all the configurations, the damper shaft can have a blind hole and only be formed in sections as a hollow shaft. It is also possible and preferred that the damper shaft is formed to be continuously hollow. In particular in each case a seal between the damper shaft and the housing is provided on each housing passage.

The inlet and the outlet of the displacer apparatus are preferably arranged on different axial sides of the displacer apparatus. In particular, the outlet is connected to the inlet via the damping gap.

In particular, the magnetic field is formed to be weaker in a region of the inlet than in a region of the outlet. Cavitation during intake is prevented as a result.

In all the configurations, it is particularly preferable that the damping circuit of the magnetorheological fluid is arranged fully within the housing. As a result of this, a compact structure is achieved. The sealing outlay is also reduced as a result of this.

In preferred further developments, it is preferable that at least one sensor detects a measure for an axial position of the coupling rod and/or for an angle position of the damper shaft.

In all of the configurations, it is preferable that a scale apparatus is arranged on the spindle nut and/or the coupling rod. A sensor is preferably fitted on the housing, which sensor detects a measure for an axial position or angle position with the scale apparatus. It is also possible that a load sensor for detection of a variable for a torque at the damper shaft is provided.

In preferred further developments, at least one electric motor which can be coupled to the damper shaft and/or the coupling rod is provided. As a result of this, an active system can be achieved in the case of which an active transfer between different positions is possible.

In all of the configurations, it is also possible that at least one sensor apparatus is provided which comprises at least one position and/or distance sensor for detection of a position and/or a distance from surrounding objects. The control apparatus can then be formed and set up to control the rotary damper as a function of the sensor data of the sensor apparatus.

If one considers the mode of operation of the displacer apparatus, it becomes clear that in a certain position and when considering an individual "tooth space" in the region of the inlet, the tooth volume initially increases, as a result of which the working fluid is taken in. As soon as, during further rotation, no communication is possible any more between inlet and tooth space, the tooth volume must remain approximately the same since no volume compensation is possible any more. The tooth space is subsequently released in the direction of the outlet. The conveying medium is compressed and pressure is built up as a result of the reducing tooth space.

In the case of the rotary damper with intake side and pressure side at different face sides, the magnetorheological fluid is conveyed from one side (suction level) to the other side (pressure level). The pressure level and the intake level are connected via the annular gap radially between the second displacer component and the inside of the housing. This damping gap is used as an "MRF valve". In the event of a magnetic field acting in the magnet gap, a pressure difference is generated and the drive moment is increased.

Parts which move relative to one another generally require running clearances (gaps) for perfect functioning. There must be a radial gap between an outer tooth profile and an inner tooth profile (outer rotor to inner rotor). In particular the face-side (axial) gaps are decisive for the level of the pressure build-up, so there should be no or only little overflow. In order to keep the losses as a result of internal leakage as low as possible, a magnetic field preferably acts upon all of the separating gaps and transition gaps in the displacer apparatus, as a result of which additional sealing (so to speak a magnetic seal) is produced by the magnetorheological fluid. As a result of this, the displacer apparatus can be manufactured with greater tolerances and thus at lower cost or higher pressures (braking torques) are reached in the case of low tolerances. Low idling pressures and high maximum pressures are thus also achieved during energization in a simple manner.

The compensation volume for temperature and/or leakage compensation is preferably arranged approximately centrally between the intake side and the pressure side. However, any other position is also conceivable.

The rotary damper is preferably embodied in the manner of a gerotor pump and has a hollow shaft. Low production costs are one significant advantage of the invention.

The rotary damper or the housing of the rotary damper can be fastened e.g. to a bracket in all cases. The threaded spindle is preferably connected in a rotationally rigid manner with an articulated lug to the bracket so that e.g. only a pivoting movement is possible. The axial force introduced via the kinematics is converted by the threaded spindle/threaded nut combination into a torque. The threaded nut can furthermore output the axial force to the housing of the rotary damper (pump cover).

The connection of the threaded nut to the rotary damper can only transmit a torque, as a result no axial force is introduced into the rotary damper.

In order to compensate for the thermal expansion of the MR fluid, in particular temperature compensation is provided. This is located here (approximately) in the center of the magnet gap, as a result it must be pretensioned with (approximately) half the maximum operating pressure.

In order to enable as small as possible a pivoting out of the threaded spindle in the door, the rotary damper is preferably suspended on the side opposite the spindle and is fastened to a device in particular with the bracket (sheet metal bracket or steel bracket).

Instead of the threaded spindle with a threaded nut, a ball screw spindle or circulating ball spindle or a toothed rod with a gear wheel or a frictionally engaged connection can also be used.

A parallel arrangement is also possible. In the case of a coaxial arrangement of rotary damper (gerotor pump) and threaded spindle, the rotary damper or the displacer components are larger due to the required spindle diameter. A specific minimum diameter of the threaded spindle is often required due to the possible risk of kinking. The tensile and compression load is less critical. As a result of the resultant relatively large spindle diameter, the threaded nut must also have a larger diameter, as a result of which the rotary damper becomes overall heavier and more expensive and requires more installation space. However, the possible braking torque also becomes larger.

If only a small braking torque is required, the rotary damper could be arranged parallel to the threaded spindle and driven by means of a transmission element such as e.g. a toothing, a friction wheel, a belt or a toothed belt, a chain, a flat or V belt. As a result of this, the rotary damper can be smaller. Moreover, in this case, the transmission ratio between spindle and the rotary damper as an MRF brake can also be varied.

If only a relatively small active force is required, this can be generated with a small electric motor. For example, a holding force of 1500N can be generated during braking. If only relatively little linear force in the range of e.g. <100N is required at the rotary damper for (slow) movement, this force can be applied by a small electric motor.

So that a small and low-cost electric motor can be used, an electric motor must generally rotate with a high rotational speed ($P=(M*n)/9550$). The combination of electric motor and linear units is costly and installation space-intensive due to the movement conversion required for this (linear into rotational) and speed reduction (transmission) in the case of the prior art. In the case of this invention, the spindle transmission can be used as a low-cost "first transmission". The flange or collar of the spindle nut which already rotates in the case of this construction can be embodied as a large gear wheel and be easily preferably picked up by a second smaller gear wheel assigned to the electric motor so that a low-cost second transmission stage is present. The rotary encoder for control of the electric motor is also already present. One thus obtains a low-cost and simple solution for an active actuating device such as e.g. a linear unit in the case of tooling machines or handling devices, an active door in buildings (house doors, internal door, garage door . . . ) or in the case of vehicles (e.g. easy opening/closing of a motor vehicle door).

A scale apparatus (e.g. increments and in particular magnetic increments) is preferably mounted on the spindle nut. A rotary encoder fastened to the stationary housing detects the rotational movement and passes this on to the controller or electronics.

Rotary encoders or angle position encoders can be used. One great advantage of such a construction/solution is that a large circumference is generated by the large diameter, in addition the threaded nut rotates in one concrete configuration approx. four revolutions per stroke, as a result of which the circumference is passed over four times. A substantial transmission ratio of measured stroke to actual stroke arises so that a lower cost sensor with a lower resolution can be used.

Sensor parts which are integrated into the threaded spindle can also be used, wherein a magnet stack can be incorporated into the piston rod, which magnet stack is evaluated by an external sensor. It is also possible to use external sensors.

Alternatively to this or also in combination, a rotary encoder on a rotatable component, thus e.g. a longitudinal encoder between a door pillar and a door or a near-field sensor (optical sensor which monitors the movements), can be used.

In order to compensate for the thermal expansion in particular in the temperature range between −40° C. and 80° C. of the MR fluid and pretension the system, a compensating apparatus is preferably used for temperature compensation. In particular a gas pressure (preferably air or nitrogen) acts upon the compensating volume. The gas pressure must correspond at least to half the operating pressure of the rotary damper in order not to have any unintended weakness as a result of the gas pressure spring in the system.

It is possible that the gas pressure is separated by a rubber membrane, as a result of which a function which is independent of the position is ensured. If an upright position can be ensured, a membrane can be omitted. The gas pressure cushion must then always be located at the highest point of the rotary damper. It is also possible to use a separating piston, wherein the separation of gas volume from the MR volume is carried out by the piston.

It is also possible to provide a damping gap or damping duct or a flow duct or overflow duct with a cooling apparatus (e.g. heat exchanger, cooler, cooler with fan . . . ) or blow (cool) air onto the rotary damper so that the temperature (where necessary) is reduced.

Depending on the material used, a remaining magnetic residual magnetic field in the system can occur depending on e.g. the number of switches (on-off . . . ) . The base moment/force increases as a result. The residual field can where necessary and/or regularly be reduced or (practically) entirely eliminated as a result of a magnetic interaction field which weakens over time (with increasing amplitude).

The rotary damper can also be used as a shock absorber in the case of chassis or buildings/bridges in order to quickly allow the vibrations of the sprung masses to subside. In the case of buildings and bridges, the use can also serve to damp earthquakes.

The invention is also directed at (a) transport means such as e.g. troop transporter, tank, helicopter or the like with one or more of the rotary dampers described above. It is thus possible e.g. to protect transported persons from health-endangering or even life-threatening impacts/momentum.

The method according to the invention serves to damp a linear movement with a rotary damper, wherein a relative axial movement of a coupling rod of the rotary damper is converted into a rotational movement of the hollow shaft of the rotary damper. At least one displacer apparatus is arranged in the housing. The displacer apparatus comprises the damper shaft and displacer components which engage in one another and are rotatable relative to one another and contains a magnetorheological fluid as the working fluid. A magnetic field acts upon the displacer components in order to damp a rotational movement of the damper shaft.

The method according to the invention is very advantageous since it enables a simple adjustment of the braking torque of the rotary damper. The braking torque can be adjusted rapidly and flexibly in wide ranges. Only a small amount of installation space and low weight are required for this.

In one preferred further development, the method is carried out with a rotary damper which comprises a housing and at least one magnetic field source and a damper shaft formed as a hollow shaft. A coupling rod is preferably received in the damper shaft. The hollow shaft and the coupling rod have in particular transmission units which interact with one another and convert a relative axial movement of the coupling rod into a rotational movement of the hollow shaft.

At least one displacer apparatus is preferably arranged in the housing. The displacer apparatus comprises displacer components which engage in one another and are rotatable relative to one another and the damper shaft and contains a magnetorheological fluid as the working fluid and can thus be operated. The magnetic field source exerts a magnetic field where necessary on the displacer components which engage in one another and are rotatable relative to one another in order to damp a rotational movement of the damper shaft.

The invention also relates to an assembly for energy absorption in the case of an overload event. The assembly can be part of a (mine protection) seat or comprise such or be formed as such. The assembly comprises in each case at least one rotary damper. The assembly serves in the case of overload events (occurring on a one-off basis) to avoid or reduce damage to objects such as people or items. In this case, the assembly reduces the load resulting from a one-off energy input on an object (such as a person or an item) arranged on the assembly and coupled thereto. Such a one-off overload event with an energy input occurs e.g. in particular in the event of a helicopter crashing or e.g. in the event of an emergency landing with an aircraft or an explosion of a mine.

In particular, the assembly according to the invention is used on transport means, such as troop transporters, tanks, helicopters or the like in order to protect in particular transported people from health-endangering or even life-threatening impacts if, for example, a mine is exploded under the transport means.

In the case of the rotary damper in this configuration, no preloading into an end position is in principle present. The rotary damper is not pretensioned in any direction. Identical characteristics in both rotational directions can in principle be set as result of this. The smoothness or the stiffness of a damped linear movement can be set independently of the direction of movement. The rotary damper can thus in the event of deployment be used as an energy absorption element in the event of overload (e.g. explosion of a mine) and also as a (permanent) comfort damper (shock absorber) during travel.

An assembly according to the invention comprises at least one rotary damper and serves in particular the purpose of energy absorption in the case of an overload event. At least one energy absorber for energy absorption and reduction of a resultant load in particular on at least a part of the assembly or on an object which is coupled or can be coupled with the assembly is encompassed. The energy absorber comprises at least one rotary damper or is formed as a rotary damper. The energy absorber comprises at least one fastening apparatus provided thereon and at least one retaining apparatus provided thereon. The fastening apparatus is preferably connected to one end or part and the retaining apparatus is arranged at another end or part of the energy absorber or fastened thereon. The energy absorber is provided in the case of a relative movement between the fastening apparatus and the retaining apparatus to absorb energy and in particular dissipate energy or convert it into heat in particular to reduce the load on an object which can be connected or coupled to the assembly. The energy absorber comprises the rotary damper. The rotary damper has a housing and at least one magnetic field source and a damper shaft formed as a hollow shaft. A coupling rod is received in the damper shaft. The hollow shaft and the coupling rod have transmission elements which interact with one another and convert a relative axial movement of the coupling rod into a rotational movement of the hollow shaft. At least one displacer apparatus is arranged in the housing. The displacer apparatus comprises displacer components which engage in one another and are rotatable relative to one another and the damper shaft and contains a magnetorheological fluid as the working fluid and can thus be operated. The magnetic field source is suitable and formed to exert a magnetic field on the displacer components in order to damp a rotational movement of the damper shaft. As a result of this, a relative linear movement of the fastening apparatus and the retaining apparatus of the energy absorber can be damped during energy absorption in the case of the overload event.

This assembly according to the invention has many advantages. One significant advantage of the assembly according to the invention lies in the fact that a linear movement is converted into a rotational movement. In this case, a desired transmission ratio can also be set in order e.g. to absorb particularly large forces.

The assembly preferably comprises a seat apparatus or at least one seat apparatus. The retaining apparatus is connected to the seat apparatus and the fastening apparatus can be connected to the body of a transport means. A movement of the seat apparatus can be damped as a result of this.

In particular, the assembly comprises a seat apparatus of a motor vehicle and at least one energy absorber. The seat apparatus has in all cases preferably a seat frame and at least one seat and in particular one or precisely one seat. The energy absorber is fitted in particular functionally between the seat and the seat frame.

It is possible that the seat apparatus is fastened via two units of which at least one unit has the energy absorber. It is also possible that each unit has in each case an energy absorber. Here, both units can serve to absorb impacts in different directions of movement. It is also possible that both units serve identical purposes. It is also possible that one unit comprises a damper apparatus for damping normal impacts during operation, while the other unit has an energy absorber for energy absorption in accidents.

It is also possible that two units are installed. Two systems or units can also be installed for e.g. mine protection seats with two columns. The rotary dampers can be connected fixedly to the vehicle or the seat.

It is also possible to distribute the functions to two or more units, e.g. the damping can be provided in one column and the restoring can be provided in the other column. If two units or energy absorbers are provided, each energy absorber can only have half the force or half the working range. It is possible that an energy absorber damps a first explosion and a second damps a second explosion or the impact with the ground after the first explosion.

The assembly is designed in particular for a one-off load, but can be used for long-term damping of impacts. In the case of an explosion or the like, the assembly dissipates or absorbs energy in order to reduce the load on an object or the damped end of the assembly.

The energy absorber is suitable and configured in particular to absorb or convert energy in the case of a one-off overload event with such a high energy input in the case of which, without an energy absorber, a load which occurs on a part of the assembly would be so high and/or damage to the object would be probable or overwhelmingly probable or expected. The load can be reduced and damage to the coupled object can be avoided as a result of the energy absorption or dissipation of energy or energy conversion of the energy absorber in the case of the overload event.

An object is coupled to the assembly if the object is arranged, placed and/or fastened e.g. on a transport surface.

The assembly according to the invention is suitable for use in different applications. For example, the assembly can be used on transport means such as tanks, helicopters, ships, aircraft or also on troop transporters or cars in order to damp significant impacts in the case e.g. of explosions and the like.

A single overload event can have several disruptive events. In the event of a mine exploding under an armored vehicle, the vehicle can initially be lifted into the air. This is the first disruptive event. The accelerations which occur in the case of the first disruptive event can be extreme. The armored vehicle subsequently falls back to the ground. The impact represents a second disruptive event of the same overload event.

A one-off overload event with a high energy input cannot only occur in the case of an explosion of a mine. Such a one-off overload event also occurs e.g. in the case of an off-road accident of a vehicle if the driver, for example, loses control and the vehicle crashes in an unforeseen and unforeseeable manner e.g. against a slope or the like and hits hard deeper on the terrain. In the case of such accidents, the level of energy input in the case of the overload event cannot be derived from the speed of the vehicle, but rather depends on the height of the drop which cannot, however, be derived e.g. from the speed of the vehicle.

With the present invention, it is thus also possible and preferable to protect the occupants of motor vehicles in the case of what are known as run off-road accidents, which are the cause e.g. of 50% of road fatalities in the USA.

Road vehicles such as cars, SUVs, HGVs, etc. leaving the asphalted road as a result of distraction, tiredness and poor weather conditions onto uneven terrain occurs particularly frequently. Vehicles with an assembly according to this invention preferably have a seat construction with a seat and a seat frame in the case of which the energy absorber described above largely absorbs the impact energy which is in particular vertical or acts substantially vertically. In order to prevent dangerous spinal column injuries to occupants, at least one energy absorber is thus located between the seat and the seat frame in order to cushion the vertical forces and/or the forces parallel to the seat backrest and/or the forces at a right angle to the seat surface. Such forces arise in the case of a hard (at least partially vertical) impact of the vehicle to the side of the carriageway. In the case of such overload events, the impact energy to be absorbed acts substantially or largely or almost entirely in the vertical direction.

In this configuration, the invention is not primarily provided to absorb energy in the case of a frontal collision. In the case of motor vehicles, however, crumple zones or airbags of the vehicle are provided for frontal collisions on the flat.

The magnitude of vertically acting loads in the case of overload events and accidents when leaving the road or the magnitude of the vertical loads in the case of mine explosions cannot, however, be derived from parameters prior to the overload event since they cannot be estimated or measured.

It is not absolutely necessary that a sensor detects that the vehicle is leaving the carriageway.

In all of the further developments, designs and exemplary embodiments, the object which can be coupled to the assembly can be coupled indirectly or directly to the assembly. The object can be arranged and/or indirectly or directly on the assembly or a component connected thereto. It can be a fixed and/or detachable connection. Or the object is placed on the assembly or a component connected thereto and retained by weight force.

In all cases, the energy absorber can be installed vertically, horizontally or also obliquely. Corresponding deflection can be carried out to derive vertical forces.

Further advantages and features of the present invention are apparent from the exemplary embodiments which are explained below with reference to the enclosed figures.

DESCRIPTION OF THE INVENTION

Exemplary embodiments of the invention are explained below with reference to the enclosed figures.

Figure 1:
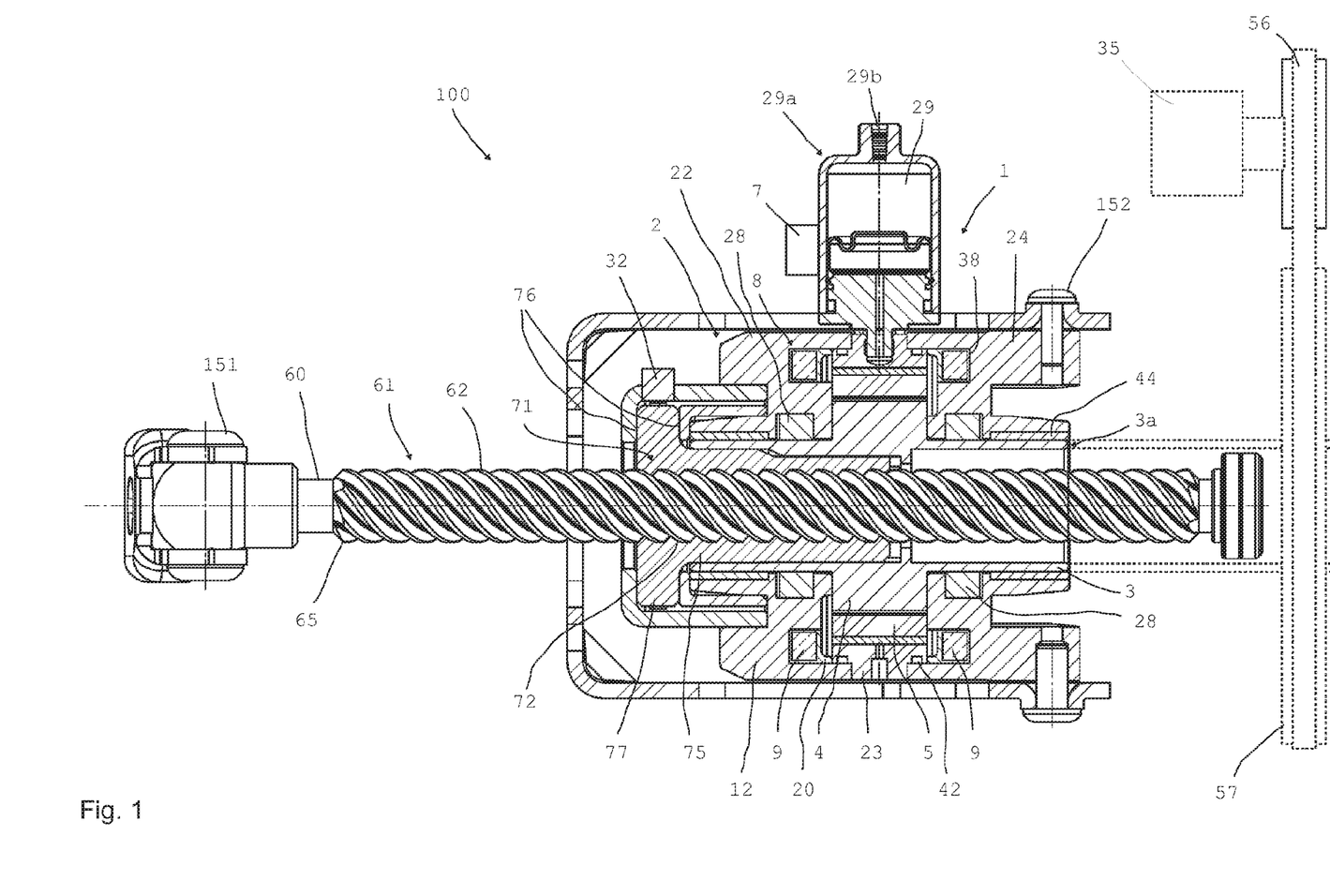
FIG. 1 shows a schematic cross-section through an apparatus with a rotary damper.

FIG. 1 shows a cross-section through an apparatus 100 with a rotary damper 1. Connecting unit 151 is connected to coupling rod 60. First transmission unit 61 with first notch profile 62 is formed on coupling rod 60. Here, first transmission unit 61 is embodied as threaded spindle 65. First transmission unit 61 interacts with second transmission unit 71 which has an adapted second notch profile 72. Here, the second transmission unit is formed as an internal thread on threaded nut 75 which is applied onto threaded spindle 65.

Threaded nut 75 has a flange 77 which stands radially further to the outside and which makes available stop surfaces 76 at its two axial ends. Here, the threaded nut is composed overall of a plastic, as a result of which self-lubrication of the contact surfaces with threaded spindle 65 and axial stops 54 and 55 of housing 12 is performed.

Threaded nut 75 has on a longitudinal portion a non-round outer contour which is coupled to a correspondingly adapted non-round inner contour of drive shaft 3 embodied as hollow shaft 3a. As a result of this, a rotational movement of threaded nut 75 is converted into a rotational movement of hollow shaft 3a.

As a result of the axial fixing of threaded nut 75 by stop surfaces 76 of flange 77 between axial stops 54 and 55 which are coupled to housing 12, threaded nut 75 remains in the same axial position relative to housing 12 even if threaded spindle 65 is moved relative to threaded nut 75.

Housing 12 is composed substantially of a first end region or end segment 22, a second end region or end segment 24 and a central region or central segment 23 arranged therebetween.

Segments 22 and 24 are screwed to one another via screws and nuts 52 and 53, wherein central region 23 is clamped between end regions 22 and 24. Seals 42 are provided between the individual segments.

Displacer apparatus 2 which comprises displacer components 4 and 5 is arranged in the interior of housing 12. Here, displacer component 4 is formed as external toothing 11 in a central region of hollow shaft 3a. Displacer component 5 is formed to be annular and has on the inside an internal toothing 13 which engages in external toothing 11 of displacer component 4.

The number of teeth of internal toothing 13 and external toothing 11 is preferably different. In particular, the number of teeth differs by the value 1. The rotational axes of displacer components 4 and 5 are furthermore arranged in particular parallel to one another.

Hollow shaft 3a is mounted via bearings 44 embodied in particular as plain bearings in end regions 22 and 24 of housing 12. There are arranged axially on the inside of the plain bearings seals 28 which seal off hollow shaft 3 with respect to housing 12 in order to prevent the escape of magnetorheological fluid from the inside of rotary damper 1.

The inner space of the displacer apparatus is filled with magnetorheological fluid 6 so that displacer components 4 and 5 displace the magnetorheological fluid in the event of a rotational movement of hollow shaft 3a.

A magnetic field can be generated via magnetic field sources 8 equipped with electric coils 9, which magnetic field substantially penetrates through displacer components 4 and 5. As a result, a magnetic field acts on the interior of displacer apparatus 2, as a result of which the active torque can be set.

Compensating apparatus 29a is connected to damping gap 18 in central region 23 and makes available a compensating volume 29 in order to compensate for different temperatures and leakage losses. For example, a separating piston or a membrane can be arranged in compensating apparatus 29s in order to reliably separate compensating volume 29 filled with air (can also be nitrogen) from the magnetorheological fluid. If during operation compensating apparatus 29a always remains arranged above the remaining magnetorheological fluid, a separating piston or a membrane can optionally also be omitted since the lighter gas of the compensating volume then collects above the magnetorheological fluid.

FIG. 1 represents yet another variant with a dotted line, in which variant the hollow shaft is formed to be lengthened at the right end here. The hollow shaft can also be lengthened at the other end. A gear wheel 57 which is coupled via a toothed belt as coupling means 56 to a gear wheel of an electric motor 35 is fitted on the hollow shaft. The drive pinion of electric motor 35 is provided with a smaller number of teeth than gear wheel 57 (step-up). Moreover, a further step-down is achieved via the coupling from the threaded nut to the threaded spindle so that electric motor 35 can operate with a higher rotational speed in order to actively move a component or support operation. A chain, V belt, flat belt, V-ribbed belt, friction wheel or a directly meshing toothing can also be used instead of the gear wheel/toothed belt.

On one hand, a high braking torque (e.g. 20 Nm) can be applied by magnetorheological rotary damper 1 via such a configuration, while on the other hand an active movement of components is possible via electric motor 35. The torque to be applied by electric motor 35 does not have to be large (e.g. <1 Nm, preferably <0.1 Nm) so that a small/low-cost motor with a low capacity is sufficient.

Figure 2:
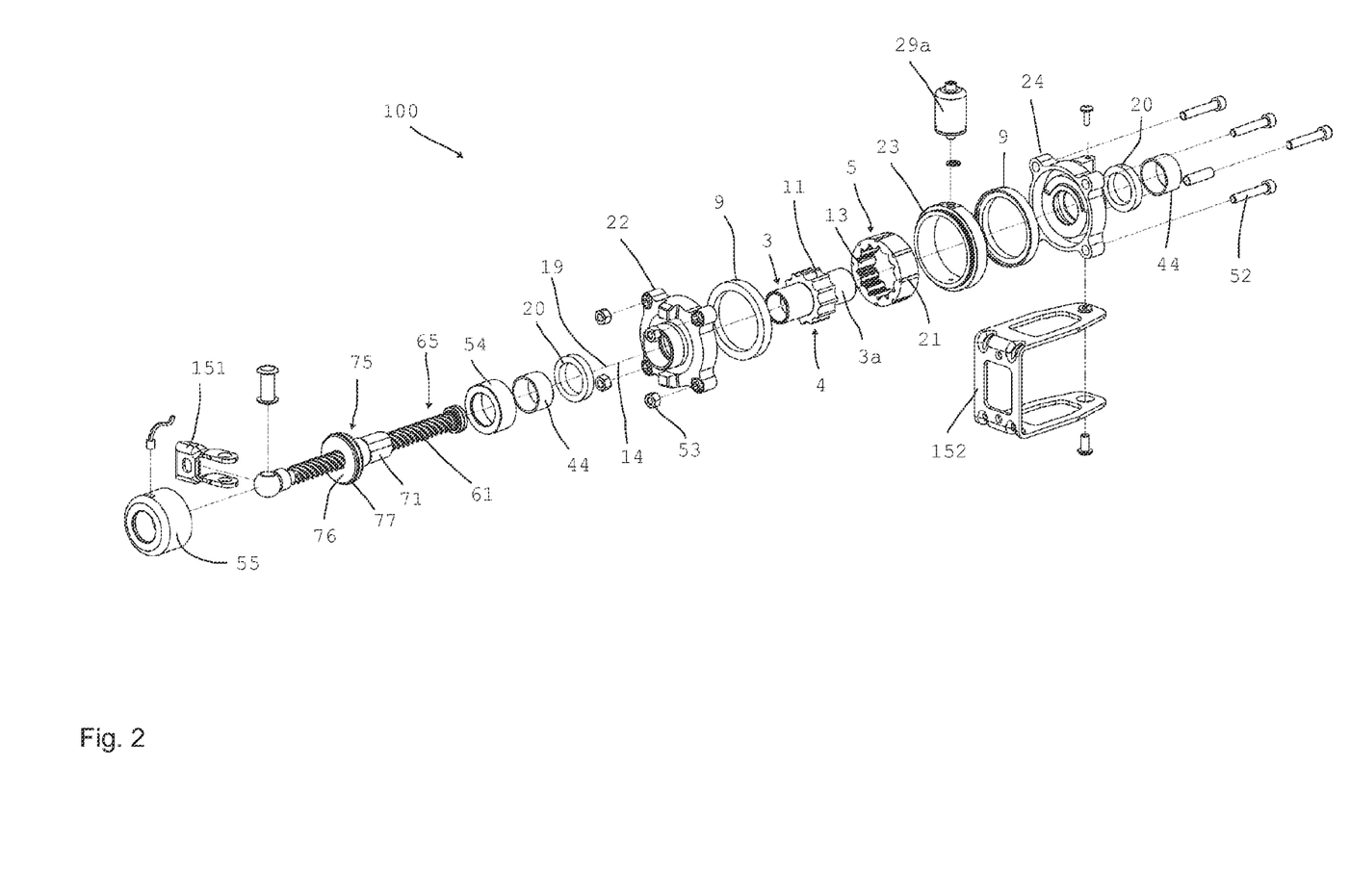
FIG. 2 shows an exploded representation of the apparatus according to FIG. 1.

FIG. 2 shows an exploded representation of the device according to FIG. 1.

Axial stop 55 serves to fix threaded nut 75 and is pressed on first end region 22 of housing 12 in order to axially fix threaded nut 75 on housing 12. On the other hand, an axial stop 54 acts against other stop surface 76 of flange 77 of threaded nut 75. Threaded nut 75 rotates during a linear movement of threaded spindle 65. Threaded spindle 65 is connected to first connecting unit 151.

Bearings 44 serve to bear damper shaft 3 formed as hollow shaft 3*a*. In the mounted state, rings 20 are positioned next to electric coils 9 and prevent a magnetic short circuit.

Housing parts 22, 23 and 24 are screwed to one another via screws 52 and nuts 53. In this case, hollow shaft 3*a* with external toothing 11 (displacer component 4) and displacer component 5 with internal toothing 13 are received inside housing 12. Displacer component 5 is arranged rotatably in housing 12. Guide units 21 on the outside ensure that a defined radial gap 18 remains between the outer wall of displacer component 5 and the inner wall of housing 12.

Radial gap 18 serves as a damping gap. The magnetorheological fluid displaced from the inlet side to the outlet side by displacer apparatus 2 is returned via radial gap 18 to the inlet side.

Figure 3:
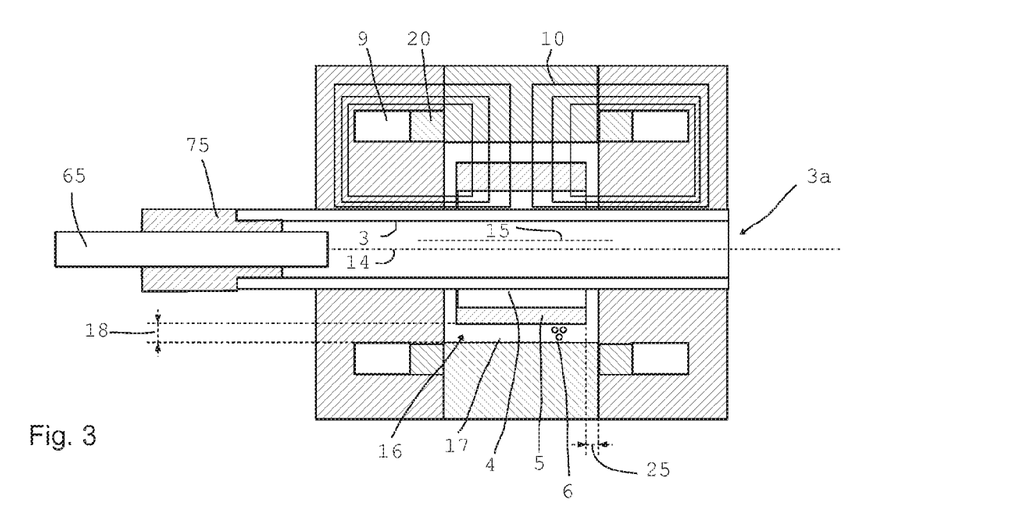
FIG. 3 shows a highly schematic cross-section through a rotary damper.

FIG. 3 shows a variant of rotary damper 1. Coupling rod 60 is again embodied as a threaded spindle 65 in order to convert an axial movement into a radial movement. Here, in turn, a threaded nut 75 is coupled to hollow shaft 3*a*.

Rotary damper 1 is extremely compact and can be produced at very low cost and can be used in high pressure ranges. Sealing mechanisms are called on to generate high maximum pressures. Expedient mechanical gap dimensions are used. Moreover, regions of the displacer apparatus and of housing 12 are, where necessary, magnetized in a targeted manner. Critical regions such as the region between the inflow and outflow ducts as well as axial gaps 25 exhibit less leakage and thus higher maximum pressures can be reached. In this case, the intermediate regions of inlet and outlet as well as the axial gaps can be magnetized so that the iron particles of the MRF are specially aligned at these points and take on a significant additional sealing action.

Several magnetic field lines of magnetic field 10 are plotted by way of example in FIG. 3. The magnetic field lines run in each case through an end region 22 or 24 and central region 23 of housing 12 and penetrate approximately radially through damping gap 18 between housing 12 and second displacer component 5 and then pass from second displacer component 5 into first displacer component 4. From there, the magnetic field lines run through axial gap 25 between first or second displacer components 4, 5 and respective end region 22, 24 so that closed magnetic field lines are produced. Here, magnetic fields which overall seal off both radial gap 18 between the displacer components and also the two axial face-side axial gaps 25 are produced by in each case an electric coil 9 in each case in an end region 22, 24.

Due to the fact that an electric coil 9 is provided in each end region of housing 12 and that electric coils 9 extend over the circumference of the respective end region, magnetic field 10 of magnetic field source 8 acts upon practically every gap between displacer components 4, 5 and between displacer components 4, 5 and housing 12. As a result, the magnetorheological particles of magnetorheological fluid 6 present in inner space 16 of rotational damper 1 or of housing 12 interlink, wherein the strength of the interlinking depends on the strength of active magnetic field 10.

A magnetic short circuit in respective end regions 22, 24 is reliably prevented by magnetically non-conducting rings 20 which overall have a relative permeability lower than ten. It is also possible that an end region (or both) is composed of two or more parts or portions. The portion adjoining displacer components 4, 5 preferably offers better magnetic conduction than the magnetically non-conducting ring. The adjoining portion (or the entire end region) preferably has a relative permeability greater than ten and in particular greater than 100 and preferably greater than 1000.

Distances and gaps 18, 25 are represented in an enlarged form in FIG. 3 in order to be able to be made visible in the first place on the represented scale.

Axial gap 25 and radial gap 18 between displacer components 4, 5 and end regions 22, 24 or between second component 5 and housing 12 in the radial direction are clearly visible. In reality, radial gap 18 is preferably approximately 2 to 4 times and in particular approximately three times as large as axial gap 25. In concrete configurations, axial gap 25 of approximately 0.03 mm and a radial gap of approximately up to 0.3 mm have been shown to be expedient.

At axial gaps 25 next to the suction kidney and the pressure kidney, the magnetic field leads to a face-side sealing off by an interlinking and alignment of the iron particles. Face-side axial gaps 25 are also reliably sealed off from high pressures. The leakage between pressure and suction side is small.

Figure 3B:
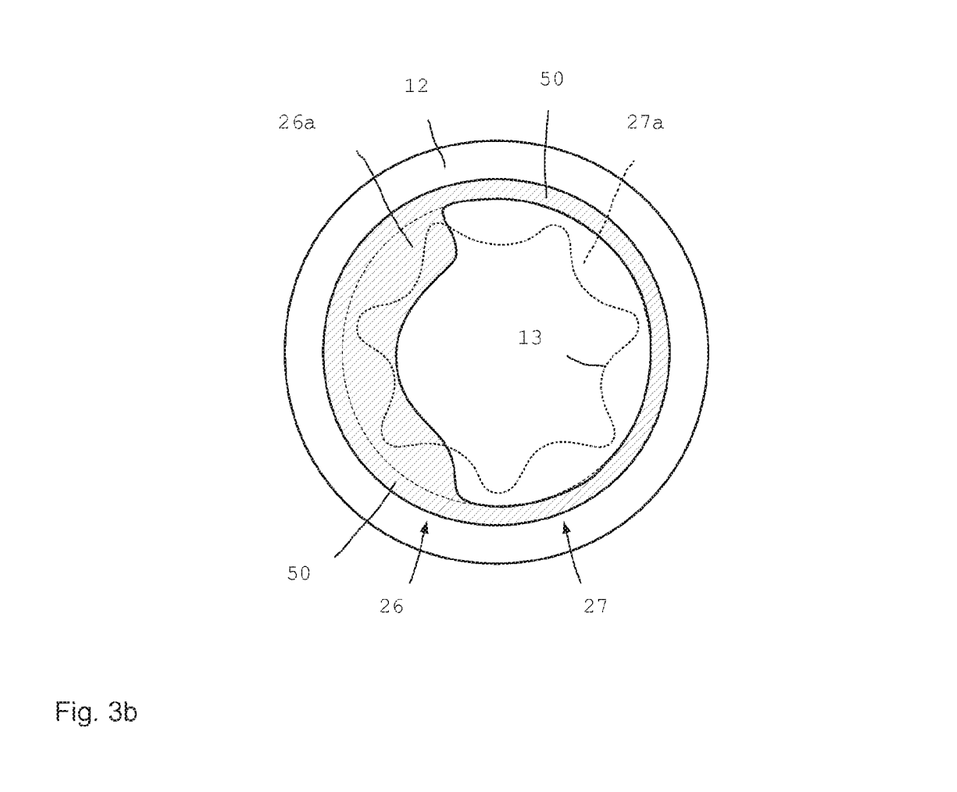
FIG. 3b shows a schematic top view of an end region of the housing of the rotary damper according to FIG. 2 or 3.

FIG. 3*b* shows a highly schematic top view of an end region 22 or 24 of a housing 12 of a rotary damper 1 from FIG. 1 or 2, wherein the inner structure of rotary damper 1 and flow guidance become clearer. The drawing shows e.g. end region 22 in a top view from the inside, but without displacer component 4. Inner contour 13 of outer displacer component 5 is plotted by dashed lines and can have more or fewer teeth in various configurations. Here, there is provided outside the radially outermost tooth contour of displacer components 4 and 5 a circumferential groove 50 in end region 22 (and 24) which extends in end region 22 (and 24) fully around the axis. Said circumferential groove 50 serves as a collecting (50) or distribution duct (51) for the MRF. The circumferential groove can, however, also extend only over partial regions of the circumference.

A suction kidney 26*a* through which the MRF can be taken in into intermediate space 43 between internal toothing 13 and external toothing 11 is formed on suction side 26 or at the inlet on the left side here in the drawing. The MRF taken in by suction kidney 26*a* flows for this purpose from pressure side 27 through damping duct 17 or its partial segments to suction side 26. Damping duct 17 extends in this case across (almost) the entire outer circumference of outer displacer component 5. For example, the narrow segments of guide units 21 can be absent on the entire circumference.

Intake kidney 26*a* and pressure kidney 27*a* formed in the other end region on the other face side extend in each case approximately in a kidney-shaped manner over an angle range <180°, as is normal in the case of toothed ring pumps or gerotor pumps. Circumferential groove 50 and intake kidney 26*a* jointly form a supply duct, while circumferential groove 51 and pressure kidney 27*a* jointly form a discharge duct.

Collecting groove 50 on the suction side and collecting groove 51 collect the MRF on the suction side and discharge it on the pressure side across the entire circumference. "Cross-talk" or a fluid short circuit is ruled out in that collecting grooves 50 and 51 are arranged on different face sides so that suction and pressure side are axially separated from one another here. The MRF is respectively collected and distributed in the region respectively of the suction kidney and the pressure kidney, the representation of which can be obtained by horizontal mirroring of FIG. 3*b*. Collecting groove 51 can also be referred to as a distribution groove 51.

The suction kidney and the pressure kidney can also be provided on the same face side, wherein collecting grooves 50 and 51 (over the full circumference) must be dispensed with since otherwise a fluid short circuit would arise. The collecting grooves do not have to extend over the entire circumference. This also applies to damping duct 17.

Figure 4:
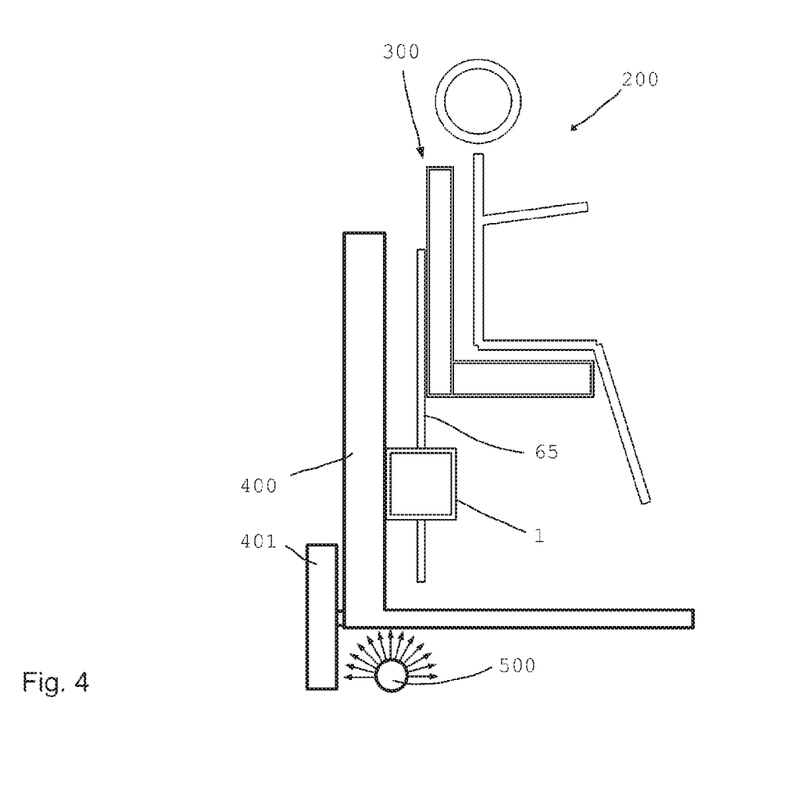
FIG. 4 shows a highly schematic top view of a use of the rotary damper in a seat.

FIG. 4 shows a seat 300 such as a driver, passenger or crew seat such as is used e.g. in the case of armored vehicles 400 with wheels 401 or chains or the like and is supposed to protect occupants 200 in the event of an explosion of mine 500. Seat 300 is connected to rotary damper 1 here in a vertically displaceable manner and via a coupling rod. Rotary damper 1 corresponds to a rotary damper 1 as described above.

Coupling rod 60 is again embodied as threaded spindle 65 in order to convert an axial movement into a radial movement. Here, in turn, a threaded nut 75 is coupled to hollow shaft 3a. Rotary damper 1 or its electric coil 9 is energized as a function of various parameters so that the occupant is injured to as small a degree as possible or not at all in the event of an explosion of a mine 500. Parameters can be sensor signals. Sensors detect the type and magnitude of the explosion.

The invention also relates in this regard to an assembly for energy absorption in the case of an overload event. The assembly can be part of the seat or comprise such or be formed as such. The assembly comprises in each case at least one rotary damper. The assembly serves in the case of one-off overload events to avoid or reduce damage to objects such as people or items. In this case, the assembly reduces the load resulting from a one-off energy input on an object arranged on the assembly and coupled thereto (such as a person or an item). Such a one-off overload event with an energy input occurs e.g. in particular in the event of a helicopter crashing or e.g. in the event of an emergency landing with an aircraft or an explosion of a mine.

In particular, the assembly according to the invention is used on transport means, such as troop transporters, tanks, helicopters or the like in order to protect in particular transported people from health-endangering or even life-threatening impacts if, for example, a mine is exploded under the transport means.

In the case of the rotary damper in this configuration, no preloading into an end position is in principle present. The rotary damper is not pretensioned in any direction. Identical characteristics in both rotational directions can in principle be set as result of this. The smoothness or the stiffness of a damped linear movement can be set independently of the direction of movement. The rotary damper can thus in the event of deployment be used as an energy absorption element in the event of overload (e.g. explosion of a mine) and also as a (permanent) comfort damper (shock absorber) during travel.

LIST OF REFERENCE NUMBERS

1 Rotary damper
2 Displacer apparatus
3 Damper shaft
3a Hollow shaft
4 Displacer component
5 Displacer component
6 Magnetorheological fluid
7 Control apparatus
8 Magnetic field source
9 Electric coil
10 Magnetic field
11 External toothing of 4
12 Housing of 2
13 Internal toothing of 5
14 Rotational axis of 4
15 Rotational axis of 5
16 Inner space of 2
17 Damping duct
18 Damping gap (radial)
19 Axis of 9
20 Ring in 12
21 Guide unit
22 First end region
23 Central region
24 Second end region
25 Axial gap
26 Inlet, suction side
26a Suction kidney
27 Outlet, pressure side
27a Pressure kidney
28 Seal at 3
29 Compensating volume
29a Compensating apparatus
29b Filling valve
32 Sensor
35 Electric motor
38 Coil holder
42 Seal of 23
43 Intermediate space
44 Bearing
50 Collecting groove
51 Collecting groove
52 Screw
53 Nut
54 Axial stop
55 Axial stop
56 Coupling means
57 Gear wheel
60 Coupling rod
61 First transmission unit
62 First notch profile
65 Threaded spindle
70 Gear wheel
71 Second transmission unit
72 Second notch profile
75 Threaded nut
76 Stop surface
77 Flange
100 Apparatus
151 Connecting unit
152 Connecting unit
200 Person
300 Seat
400 Transport means
401 Wheel

The invention claimed is:

1. A rotary damper, comprising:
   a housing;
   a damper shaft being a hollow shaft, and a coupling rod received in said damper shaft;
   said hollow shaft and said coupling rod being configured to interact with one another to convert a relative axial movement of said coupling rod into a rotational movement of said hollow shaft;
   a displacer apparatus disposed in said housing, said displacer apparatus including displacer components that mesh with one another and are rotatable relative to one another, said displacer components being disposed to form at least one damping duct extending substantially parallel with said damper shaft and a face-side axial gap with said housing, and said displacer apparatus containing a magnetorheological fluid in said at least one damping duct and in said face-side axial gap, said magnetorheological fluid forming a working fluid; and a magnetic field source configured to generate a magnetic field to act upon said displacer components and said magnetorheological fluid in order to damp a rotational movement of said damper shaft, said magnetic field source including two electric coils each configured to generate a magnetic field with a substantial portion of field lines thereof traversing said at least one damping duct and said axial gap between said housing and said displacer components and to seal said axial gap against leakage of the magnetorheological fluid;

said displacer components including a first displacer component having an outer toothing and a second displacer component having an internal toothing, and wherein said second displacer component is rotatably received in said housing;

at least one damping gap forms said at least one damping duct radially between said second displacer component and said housing;

said second displacer component is rotatably guided in said housing via a multiplicity of guide units in order to form said damping gap between said second displacer unit and said housing; and said displacer apparatus being configured as a pump; said magnetorheological fluid being conveyed by rotational movement of said displacer components from an inlet of said displacer apparatus adjacent to one of the face-side axial gaps to an outlet of said displacer apparatus adjacent on to the other one of the face-side axial gaps, and said magnetorheological fluid being conveyed via the damping gap back to the inlet of the displacer apparatus.

2. The rotary damper according to claim 1, wherein said coupling rod is formed with a notch and said hollow shaft is formed with a notch profile adapted to mesh with said notch profile of said coupling rod.

3. The rotary damper according to claim 1, wherein said coupling rod comprises a threaded spindle and wherein a threaded nut is disposed to mesh with said treaded spindle to convert the relative axial movement of said coupling rod into the rotational movement of said hollow shaft.

4. The rotary damper according to claim 3, wherein said threaded nut is formed with an axial stop and is rotatably and axially fixed in said housing.

5. The rotary damper according to claim 1, wherein said magnetic field source is configured to subject said displacer components which engage in one another and are rotatable relative to one another to a magnetic field in order to damp a rotational movement of said damper shaft.

6. The rotary damper according to claim 1, wherein said face-side axial gap includes a face-side axial gap formed between said housing and said displacer apparatus at each of the two axial ends of said displacer components and wherein a substantial part of the magnetic field of said magnetic field source penetrates through each of said axial gaps between said housing and said displacer components and brings about a sealing of the face-side axial gaps.

7. The rotary damper according to claim 1, wherein said displacer components comprise a first displacer component fixedly connected to said damper shaft and a second displacer component rotatably mounted in said housing, wherein said first displacer component is in engagement with said second displacer component and is arranged eccentrically with respect to said second displacer component.

8. The rotary damper according to claim 1, wherein said housing comprises a first end region and a second end region and a central region therebetween, and wherein said electric coils are respectively received in each of said first and second end regions, and wherein an axis of at least of one of said coils is aligned substantially parallel to said damper shaft.

9. The rotary damper according to claim 8, further comprising a compensating apparatus coupled to the central region.

10. The rotary damper according to claim 1, wherein said housing is composed of magnetically conducting material having a relative permeability of greater than 100, and further comprising a ring composed of a material with a relative permeability of less than 10 arranged axially adjacent said electric coils in said housing and axially between said electric coils and said displacer components.

11. The rotary damper according to claim 1, wherein said inlet and said outlet are arranged on different axial sides of said displacer apparatus and the magnetic field is formed to be weaker in a region of said inlet than in a region of said outlet.

12. The rotary damper according to claim 1, further comprising at least one sensor for detecting a measure for an angular position of said damper shaft.

13. A transport vehicle selected from the group consisting of troop transporters, tanks, and helicopters and comprising: a rotary damper according to claim 1 in order to protect transported persons from sudden impacts or sudden momentum changes.

14. A method for damping a linear movement, the method comprising:

providing a rotary damper having a coupling rod and a hollow shaft;

converting a relative axial movement of the coupling rod of the rotary damper into a rotational movement of the hollow shaft of the rotary damper;

providing the rotary damper with at least one displacer apparatus in a housing, the displacer apparatus including displacer components which engage in one another and are rotatable relative to one another and the damper shaft and contains a magnetorheological fluid as the working fluid; and said displacer components including a first displacer component having an outer toothing and a second displacer component having an internal toothing, and said second displacer component is rotatably received in said housing, at least one damping gap forms said at least one damping duct radially between said second displacer component and said housing, and said second displacer component is rotatably guided in said housing via a multiplicity of guide units in order to form said damping gap between said second displacer unit and said housing;

said displacer apparatus being configured as a pump; said magnetorheological fluid being conveyed by rotational movement of said displacer components from an inlet of said displacer apparatus adjacent to one of the face-side axial gaps to an outlet of said displacer apparatus adjacent on to the other one of the face-side axial gaps, and said magnetorheological fluid being conveyed via the damping gap back to the inlet of the displacer apparatus; and generating a magnetic field by energizing two electric coils to act upon the displacer components and the magnetorheological fluid in order to damp a rotational movement of the damper shaft and to seal an axial gap against a leakage of the magnetorheological fluid out of the housing, the two electric coils being disposed to cause the magnetic field to traverse a damping duct formed between the displacer components and to traverse the axial gap.

15. A rotary damper, comprising:

a housing composed of magnetically conducting material having a relative permeability of greater than 100;

a damper shaft being a hollow shaft, and a coupling rod received in said damper shaft;

said hollow shaft and said coupling rod include transmission units configured to interact with one another and to convert a relative axial movement of said coupling rod into a rotational movement of said hollow shaft;

a displacer apparatus disposed in said housing, said displacer apparatus including displacer components that mesh with one another and are rotatable relative to one another and said displacer apparatus containing a magneto-rheological fluid forming a working fluid, and said displacer components including a first displacer component having an outer toothing and a second displacer component having an internal toothing, and said second displacer component is rotatably received in said housing, at least one damping gap forms said at least one damping duct radially between said second displacer component and said housing, and said second displacer component is rotatably guided in said housing via a multiplicity of guide units in order to form said damping gap between said second displacer unit and said housing;

a magnetic field source configured to generate a magnetic field to act upon said displacer components in order to damp a rotational movement of said damper shaft; and a ring composed of a material with a relative permeability of less than 10 arranged axially adjacent said magnetic field source in said housing and axially between said magnetic field source and said displacer components; and said displacer apparatus being configured as a pump; said magnetorheological fluid being conveyed by rotational movement of said displacer components from an inlet of said displacer apparatus adjacent to one of the face-side axial gaps to an outlet of said displacer apparatus adjacent on to the other one of the face-side axial gaps, and said magnetorheological fluid being conveyed via the damping gap back to the inlet of the displacer apparatus.

16. The rotary damper according to claim 1, wherein the damping gap is formed as an annular gap divided by the guide units into several gap segments.

* * * * *